US006971453B2

(12) United States Patent
Nordhoff

(10) Patent No.: US 6,971,453 B2
(45) Date of Patent: Dec. 6, 2005

(54) CONTROL SYSTEM FOR A THREE POINT IMPLEMENT HITCH ASSEMBLY

(75) Inventor: Hendrik Nordhoff, Havixbeck (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/835,314

(22) Filed: Apr. 29, 2004

(65) Prior Publication Data

US 2005/0098329 A1 May 12, 2005

(30) Foreign Application Priority Data

Nov. 11, 2003 (DE) ............................... 103 52 898

(51) Int. Cl.[7] ............................................. A01B 59/00
(52) U.S. Cl. ........................................ 172/439; 172/7
(58) Field of Search ...................... 172/7, 8, 439–451; 280/416.2, 446.1, 186; 180/900

(56) References Cited

U.S. PATENT DOCUMENTS

| 3,247,910 A | * | 4/1966 | Bunting et al. ............. 172/460 |
| 3,750,757 A | | 8/1973 | Saetti ............................. 172/9 |
| 4,821,806 A | * | 4/1989 | Winter ........................... 172/4 |
| 5,335,499 A | * | 8/1994 | Thompson et al. ........... 60/546 |
| 5,449,042 A | * | 9/1995 | Landphair et al. .......... 172/456 |
| 6,253,859 B1 | * | 7/2001 | Coenen ....................... 172/448 |
| 6,578,641 B2 | * | 6/2003 | Bernhardt et al. .......... 172/439 |
| 6,698,523 B2 | * | 3/2004 | Barber .......................... 172/4 |
| 2001/0022226 A1 | * | 9/2001 | Staude ........................ 172/439 |
| 2002/0195258 A1 | | 12/2002 | Coenen et al. .............. 172/442 |
| 2004/0079224 A1 | | 4/2004 | Bernhardt et al. ............ 91/525 |
| 2004/0188113 A1 | * | 9/2004 | Casali et al. ................ 172/439 |

FOREIGN PATENT DOCUMENTS

| DE | 196 11 626 A1 | 11/1997 |
| FR | 1.270.600 | 9/1961 |

* cited by examiner

Primary Examiner—Thomas B. Will
Assistant Examiner—Nathan Mammen

(57) ABSTRACT

A control system controls a three point implement hitch assembly of a tractor. The three point implement hitch assembly includes an upper link and two lower links. The upper link includes an adjustable length double acting hydraulic unit. The position of each lower link is controlled by an adjustable length double acting hydraulic unit. A hydraulic circuit controls communication between the hydraulic units, a hydraulic supply and a hydraulic tank. The circuit permits each hydraulic unit to be controlled independently of one another.

6 Claims, 3 Drawing Sheets

US 6,971,453 B2

CONTROL SYSTEM FOR A THREE POINT IMPLEMENT HITCH ASSEMBLY

BACKGROUND

The invention relates to a system for controlling a three point implement hitch assembly for an agricultural or industrial utility vehicle, such as a tractor.

Frequently agricultural or industrial utility vehicles or operating machines contain systems for the attachment of implements. A conventional agricultural tractor includes a rear-mounted three point implement hitch which normally includes two lower links and one upper link, whose free ends are equipped with catch hooks or other coupling means for coupling to attached implements. Usually, each of the two lower links is connected by lift links to a common lifting shaft which is rotated hydraulically. The result is a rigid mechanical connection between the two lower links and an enforced synchronization of the lower links.

DE 199 39 967 C2 shows a lifting system for lower links of an attachment system of a tractor. Here the hydraulic units which control the position of the lower links can be controlled independently of each other. This type of control should guarantee an exact repositioning of the lower links. Moreover, a repositioning of the two lower links independently of each other should be performed, in order, for example, to equalize a transverse inclination between the utility vehicle and the implement.

The equalization of a transverse inclination between the utility vehicle and the implement, in particular, appears problematical during the continuing operation with the attachment system known from DE 199 39 967 C2, since an active control of the hydraulic unit that repositions the direction of the lower links is required for this system. This requires a complex and costly control system.

SUMMARY

Accordingly, an object of this invention is to provide a simplified system and a method for controlling a three point implement hitch.

These and other objects are achieved by the present invention, wherein a hitch control system includes a hydraulic circuit which is configured so that the hydraulic units associated with the lower links can be connected to each other even if the hydraulic units are not connected with the hydraulic supply or the hydraulic tank.

This circuit makes possible an inactive repositioning of the lower links, and eliminates the need for a costly control system. This results in a degree of freedom of movement about the longitudinal axis of the utility vehicle, an improved conformation to the ground of an attached implement coupled to the utility vehicle, and, this degree of freedom of movement need not be supplied by the implement. In addition, rotational degrees of freedom for towed implements could be utilized. Thereby, the system is able to equalize a transverse inclination between the utility vehicle and the implement for the control of a three point implement hitch assembly.

If the hydraulic unit is an adjustable length double acting hydraulic cylinder with a piston end chamber and a rod end chamber, the piston end chambers or rod end chambers of the hydraulic cylinders may be connected to each other.

Preferably, the upper link is provided with a double acting hydraulic unit adjustable in length. The upper link could definitely be configured as a double acting hydraulic cylinder that can be repositioned in length. In so far a hydraulic switching system of the hydraulic units for the lower links with the hydraulic unit of the upper link is possible. Thereby the hydraulic units can fundamentally be switched in such a way that the pressure force of the upper link operates upon the lifting force of the lower links and thereby upon their hydraulic units. In a system of the upper link and the lower links according to a classical three point implement hitch, by this system a higher transfer of weight from the implement to the utility vehicle and a better conformation to the ground of the implement in the ongoing operation can be attained. This is possible to great advantage by a passive shifting of the instant center by means of the hydraulic units so that even here no costly control system of the hydraulic units, for example, in the form of a control circuit and correspondingly controlled valves is required. This applies particularly to implements that are guided in depth on a roll, for example, a cultivator.

Preferably, the hydraulic unit is a hydraulic cylinder which has a piston end chamber and a rod end chamber. The piston end chamber and the rod end chamber could each be connected to a supply line. As described so far, the three point implement hitch assembly could be made with conventional components. Alternatively, two single acting hydraulic cylinders could also be provided, each of which could also be connected over a supply line with the hydraulic supply and/or the hydraulic tank.

Valves between the hydraulic supply or the hydraulic tank and a hydraulic unit control the hydraulic units independently of each other. The valves may be 4-position, 4-way proportional valves. Alternatively, several individual valves could be provided to open and close the connection between the piston end chamber of a hydraulic unit and the hydraulic supply or the hydraulic tank, and to open and close the connection between the rod end chamber of a hydraulic unit and the hydraulic supply or the hydraulic tank.

These valves can be operated to selectively control the individual hydraulic units to extend and retract the pistons of the hydraulic cylinders, to depressurized them.

Preferably, the supply lines between one valve and the associated hydraulic unit, and the supply lines between a second valve and its associated hydraulic unit can be connected to each other by connecting lines which can be opened or closed by further valves. Thereby, the individual hydraulic units can be directly connected to each other even if they are not connected to the hydraulic supply and/or the hydraulic tank, and the connection of two hydraulic units with each other can be activated or deactivated. The further valves could be 4-position 2-way valves. The further valves allow communication between the piston end chamber and the rod end chamber of different hydraulic units to be opened or closed.

Preferably, one of the connecting line is connected to the hydraulic tank by a shut off valve. Preferably, a shut off valve is provided for all connecting lines, each of which connects two hydraulic units with each other. In case that the hydraulic units for the lower links are double acting hydraulic cylinders, the piston end chambers of the hydraulic cylinders are connected with the hydraulic tank over the connecting line.

With this system the piston end chamber and/or the rod end chamber of all the hydraulic units can be separated from the hydraulic supply and the hydraulic tank. Moreover, the piston end chamber and/or the rod end chamber of at least two hydraulic units can be separated from each other. The piston end chamber and/or the rod end chamber of at least two hydraulic units can be connected with each other. The piston end chamber and/or the rod end chamber of at least one hydraulic unit can be connected with the hydraulic tank. The piston end chambers of both lower link hydraulic units can be connected with the hydraulic tank. Finally, the piston end chambers of all hydraulic units can be connected with the hydraulic tank.

DETAILED DESCRIPTION

Figure 1:
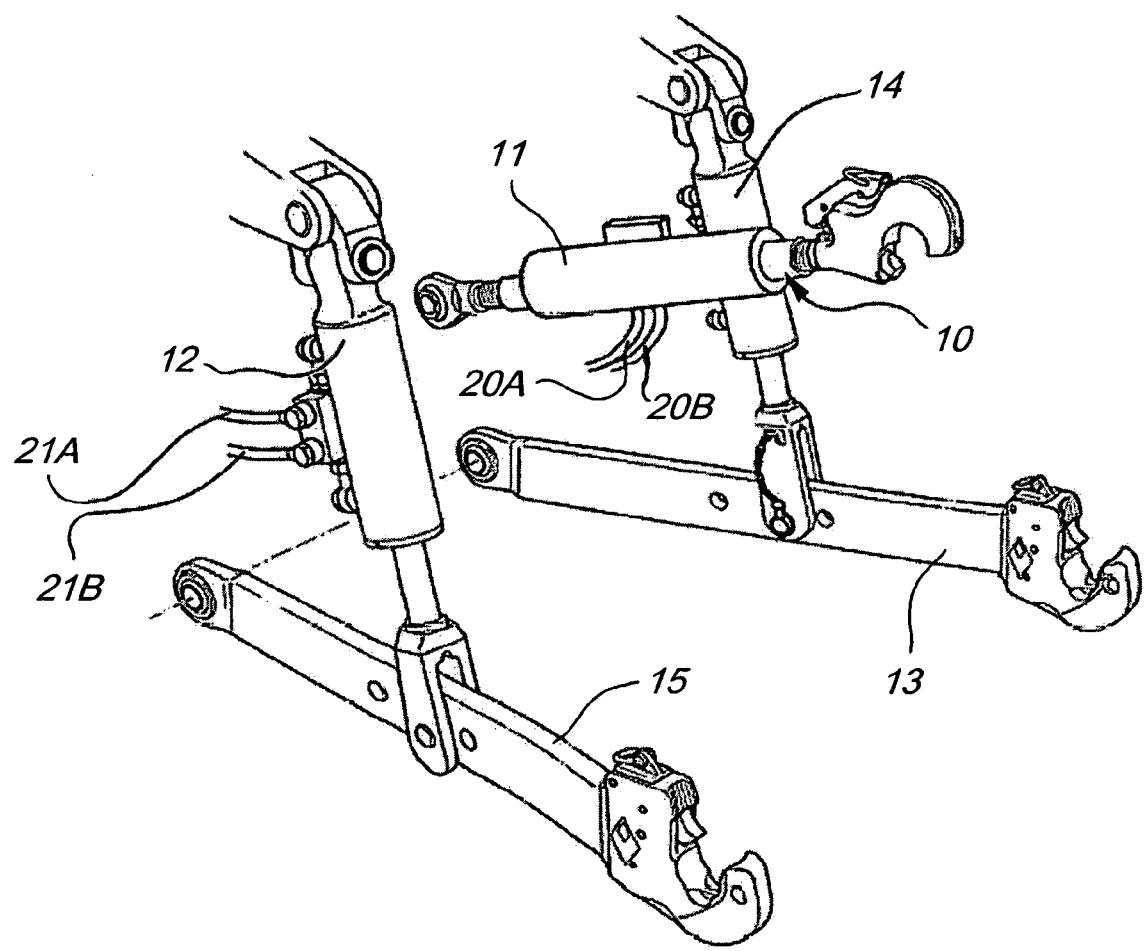
FIG. 1 is a perspective view of a prior art conventional three point implement hitch.

A known three point implement hitch assembly hydraulic circuit diagram for a known prior art control system for a three point implement hitch assembly is shown in FIG. 1. Similar reference numbers are used for similar parts in FIGS. 1–3. The hitch includes an upper link 11 and left and right lower links 13, 15. The upper link 11 includes an adjustable length double acting hydraulic cylinder unit 10. The lower links are each raised or lowered by the hydraulic units 12 and 14. The two hydraulic units 12, 14 are also adjustable length double acting hydraulic cylinders.

Figure 2:
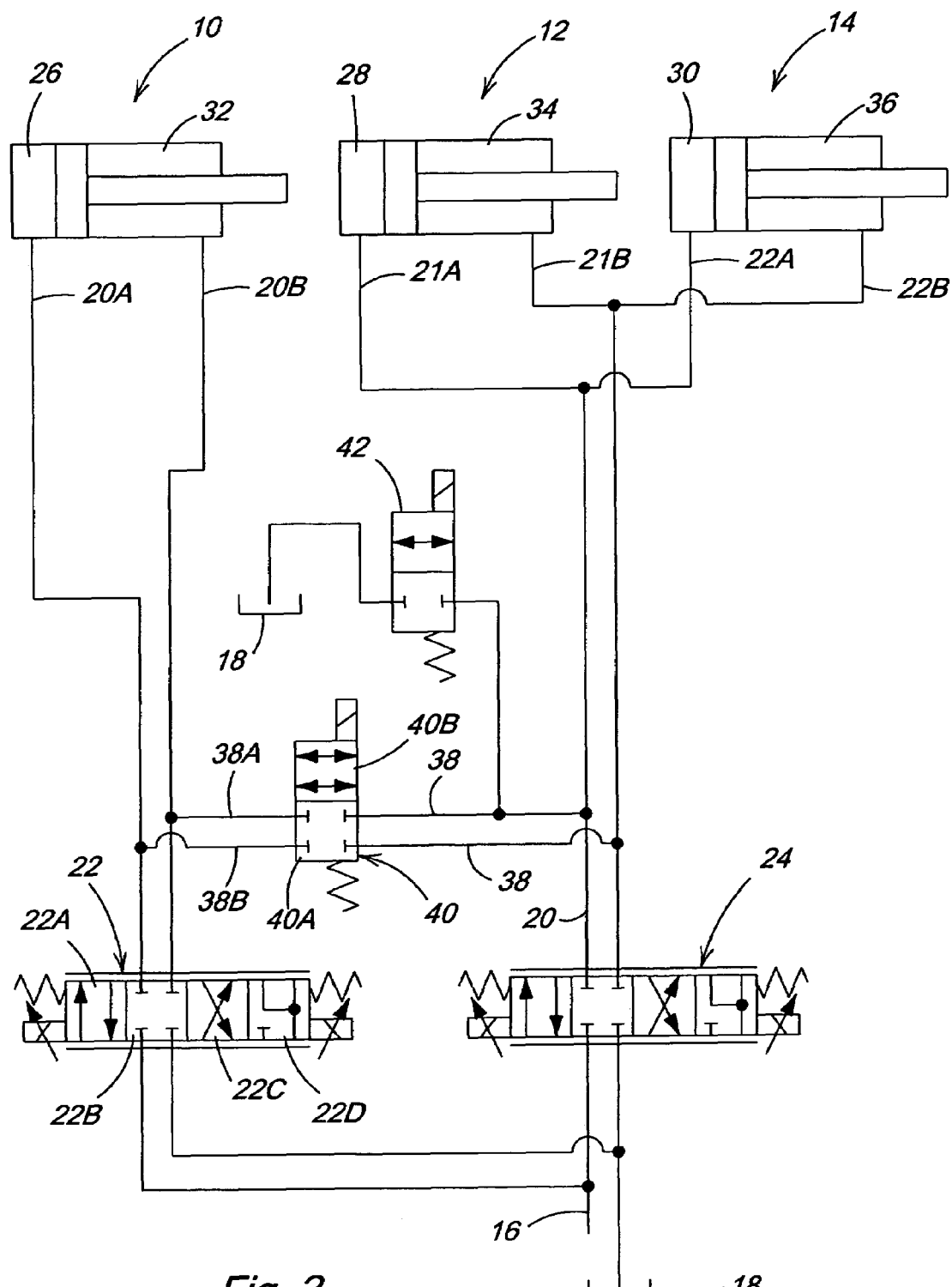
FIG. 2 is a schematic diagram of prior art conventional three point implement hitch control system.

Referring now to FIG. 2, a known hydraulic circuit includes a plurality of hydraulic lines 20A, 20B, 21A, 21B, 22A and 22B and proportional valves 22, 24 which connect the hydraulic units 10, 12, 14 with a hydraulic supply 16 and a hydraulic tank 18. In the momentarily active valve position of the valves 22, 24 shown in FIG. 1, each of the hydraulic units 10, 12 and 14 is separated from the supply 16 and the tank 18. Each of the double acting hydraulic cylinders 10, 12, 14 include a piston end chamber 26, 28, 30 and a rod end chamber 32, 34, 36. Valve 22 is a 4-position 4-way valve.

Connecting lines 38A, 38B, and a valve 40 connect the supply lines 20A, 20B to the supply lines 21A, 21B and 22A, 22B. A shutoff valve 42 controls communication between piston end chambers 28, 30 of the hydraulic units 12, 14 and the tank 18.

When valve 22 is in its active position with its left valve position 22A, the piston of the hydraulic unit 10 is extended. In the position of the valve 22 shown in FIG. 1, position 22B, the hydraulic unit 10 remains in its position, provided that valve 40 is in the position 40A shown in FIG. 1. When the valve 22 is located in the third position 22C, the hydraulic unit 10 is retracted. When the valve 22 is in the position 22D, the piston end chamber 26 as well as the rod end chamber 32 of the hydraulic unit 10 is connected with the tank 18, and they are depressurized. The corresponding situations applies to the positions of the valve 24, with which the hydraulic units 12, 14 are controlled in a corresponding way, since the supply lines 20 between the valve 24 and the hydraulic units 12, 14 are connected to each other.

Figure 3:
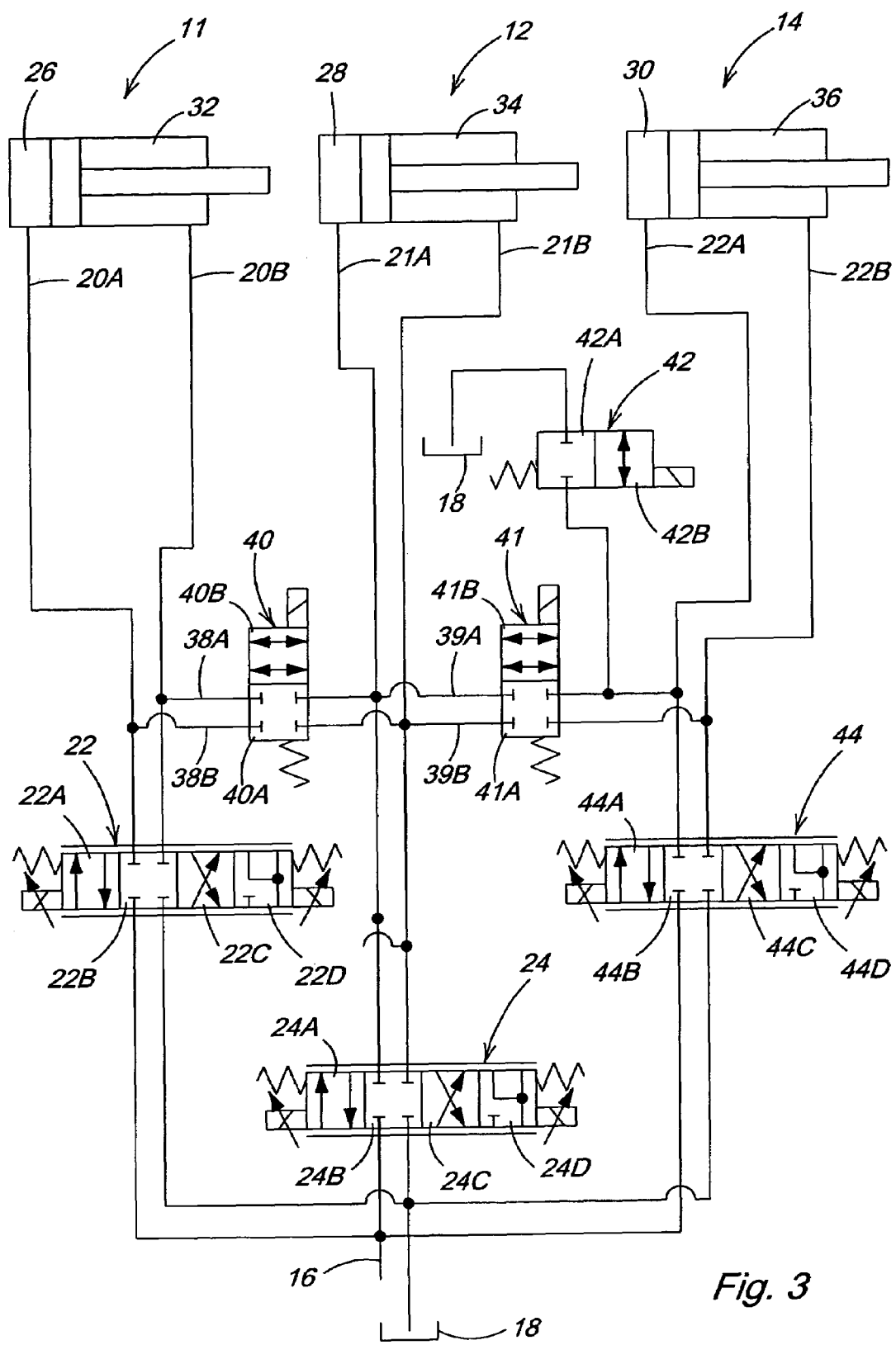
FIG. 3 is a schematic diagram of a three point hitch control system according to the present invention.

Referring now to FIG. 3, according to the present invention, valve 22 controls hydraulic unit 10 via supply lines 20A, 20B, valve 24 controls hydraulic unit 12 via supply lines 21A, 21B, and a further valve 44 controls hydraulic unit 14 via supply lines 22A, 22B. Connecting lines 38A, 38B, and a valve 40 connect the supply lines 20A, 20B to the supply lines 21A, 21B. The connecting lines 39A and 39B and valve 41 controllably connect supply lines 21A, 21B to the supply lines 22A, 22B. A shutoff valve 42 controls communication between piston end chambers 28, 30 of the hydraulic units 12, 14 and the tank 18.

Accordingly, hydraulic unit 12 can be controlled independently of hydraulic unit 14 by valves 22 and 44. With valves 22, 24, 44, 40 in the positions shown in FIG. 3, all hydraulic units 10, 12, 14 are prevented from moving, so that an implement (not shown) which is coupled to the hitch cannot perform any movement.

If both valves 40 and 41 are open (positions 40B and 41B), then the piston end chamber 26 of the hydraulic unit 10 is connected with the rod end chambers 34, 36 of the hydraulic units 12, 14. Thereby, a pressure force acting upon the upper link and hence upon the hydraulic unit 10 can be converted to a lifting force component on the hydraulic units 12, 14. The force applied to the hydraulic unit 10 is composed generally of the weight and towing force of the implement (not shown). With this circuit it is possible to transfer weight from the implement to the vehicle (not shown). The weight transfer refers to the load upon the front axle of the vehicle that is a function of the support force of the implement acting upon the vehicle.

In known three point implement hitch assemblies a positive support force of an implement always results in a reduction of the load upon the front axle of the vehicle. The operating depth of the implement is controlled by hydraulic units 10, 12 and 14. Valve 42 has an open position wherein the rod end chamber 32, the piston end chamber 28 and the piston end chamber 30 are depressurized and connected to the hydraulic tank 18.

With valves 22, 24 and 40 closed and valves 40 and 41 open, the hydraulic units 10, 12, 14 support a "folding over" of the implement (not shown) about a transverse axis of the vehicle. Thereby, the implement can be better uncoupled from the movements of the vehicle. This circuit is particularly appropriate for implements which include a roller and which are at least partially guided by the roller. The hydraulic unit 10 is loaded as a function of the support force of the implement, which corresponds to a hydraulic pressure in the rod end chambers 34, 36 of the hydraulic units 12, 14, whereby the weight transfer of the support force with respect to this upon the front axle is attained. Thereby an increased absorption of the support force is possible as well as better operating characteristics of the coupled vehicle and implement, since the degrees of freedom particularly those of the hydraulic units 10, 12, 14 are damped and the vehicle is loaded more uniformly in case of vibration excitation. Thereby no lever arm is created to the support surface of the rear wheels of the vehicle, as it exists, for example, in the case of a towing jaws coupling. The height of the implement is adjusted over the rod end chamber volume of the hydraulic units 10, 12, 14.

With valves 22, 24 and 44 in positions 22B, 24B and 44B, respectively, and valve 41 in position 41B, the hydraulic unit 10 is blocked and the hydraulic units 12, 14 are in a floating position. With a horizontal upper link or an upper link arranged parallel to the lower links or a horizontal hydraulic unit 10, or a hydraulic unit 10 arranged parallel to the lower links this leads to a better intake performance of the implements, since no weight transfer occurs from the implement to the vehicle due to the towing force in contrast to the three point implement hitch assemblies known from the state of the art.

If an implement with a high towing force demand and low weight and low intake force is to be uncoupled from the vehicle, then preferably valve 40 is placed in position 40A, valve 41 is placed in position 41B, and valves 22, 24 and 44 are placed in positions 22B, 24B and 44B, respectively. This blocks flow to the hydraulic unit 10 so that the upper link 10 and the lower links 13, 15 form a parallelogram which couples the implement to the vehicle. The implement can pivot about a fore-and-aft axis and it can pivot up and down by the lower links of the vehicle. The hydraulic units 12, 14 are connected to each other by valve 41 in order to assure a better conformation of the implement with the ground of the implement about the longitudinal axis of the vehicle. As a result, implements that cannot maintain their operating depth due to the vertical components of the towing force, can maintain their operating depth with the present system without any supplementary implement, which could be the case, for example, in underground cultivation.

The three point implement hitch assembly and control system can also be used to couple towed implements to the vehicle. This permits additional degrees of freedom about the transverse axis of the vehicle, and in the case of a three point implement hitch assembly without a lifting shaft, this permits motion about the longitudinal axis of the vehicle. Thus, this hitch control circuit can function as a) a control system without weight transfer between vehicle and implement, b) a control system with weight transfer to the front axle of the vehicle and c) a control system with negative support load.

If valve 40 is placed in position 40A, valve 41 is placed in position 41B, valve 22 is in position 22D, and valves 24 and 44 are placed in positions 24B and 44B, respectively, and valve 42 is open, then the hydraulic unit 10 is in a floating position and the rod end chambers 34, 36 of the hydraulic units 12, 14 are connected to each other. The piston end chambers 28, 30 are connected to the hydraulic tank 18 by valve 42. Thereby, the hydraulic units 12, 14 absorb the support load of the implement and can simultaneously move about the longitudinal axis of the vehicle. The hydraulic unit 10 is in a floating position and allows the implement to pivot about a transverse axis of the vehicle and permits vibration damping for towed implements.

For implements with negative support load, it is preferable for valve 40 to be in position 40A, valve 41 to be in position 41B, valve 22 to be in position 22D, and valves 24 and 44 are placed in positions 24B and 44B, respectively, and valve 42 to be closed. Negative support loads can develop particularly with empty or unequally loaded implements. In this condition, hydraulic unit 10 is also in a floating position and does not absorb any forces. The hydraulic units 12, 14 absorb the support load of the implement, where now the pressure exists in the piston end chambers 28, 30 of the hydraulic units 12, 14. The rod end chambers 34, 36 of the hydraulic units 12, 14 do not absorb any loads and are therefore depressurized. In this condition the implement can pivot about the longitudinal axis of the vehicle and the transverse axis of the vehicle.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A control system for a three point for coupling an implement to a tractor, the hitch having an upper link and a pair of lower links, first and second double acting hydraulic units, each having a head end chamber and a rod end chamber and each for controlling the position of a corresponding one of the lower links, the control system comprising:
    a hydraulic supply;
    a hydraulic tank;
    a first control valve connected between the supply, the tank and the first hydraulic unit by a first pair of hydraulic lines including a head line connected to the head end chamber and a rod line connected to the rod end chamber, the first control valve independently controlling the first hydraulic unit;
    a second control valve connected between the supply, the tank and the second hydraulic unit by a second pair of hydraulic lines including a head line connected to the head end chamber and a rod line connected to the rod end chamber, the second control valve independently controlling the second hydraulic unit, the second pair of hydraulic lines being separate from the first pair of hydraulic lines;
    a third valve connected between the first and second pair of hydraulic lines, the third valve being movable from a first position wherein communication is blocked between the first and second pair of hydraulic lines to a second position wherein the head line of the first pair of hydraulic lines is connected to the head line of the second pair of hydraulic lines and the rod line of the first pair of hydraulic lines is connected to the rod line of the second pair of hydraulic lines.

2. The control system of claim 1, further comprising:
the upper link includes a double acting hydraulic cylinder.

3. The control system of claim 1, wherein:
each of the first and second valves comprises a four way, four position proportional valve.

4. The control system of claim 1, further comprising:
a third hydraulic unit and a third valve controlling communication between the hydraulic supply, the hydraulic tank and the third hydraulic unit.

5. The control system of claim 1, wherein:
the third valve is a 4-position, 2-way valve.

6. The control system of claim 1, further comprising:
a shut off valve controlling communication between the hydraulic tank and one of the head and rod lines of the first and second pair of hydraulic lines.

* * * * *